United States Patent
Hosoi

(10) Patent No.: US 8,271,954 B2
(45) Date of Patent: Sep. 18, 2012

(54) METHOD AND APPARATUS FOR SAVING CHECKPOINT DATA WHILE DETECTING AND ANALYZING A LOOP STRUCTURE

(75) Inventor: Akira Hosoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1136 days.

(21) Appl. No.: 12/075,418

(22) Filed: Mar. 10, 2008

(65) Prior Publication Data

US 2008/0229018 A1    Sep. 18, 2008

(30) Foreign Application Priority Data

Mar. 16, 2007  (JP) .................................. 2007-069508

(51) Int. Cl.
G06F 9/44  (2006.01)
G06F 9/45  (2006.01)

(52) U.S. Cl. .......................... 717/127; 717/149; 717/160

(58) Field of Classification Search .......... 717/124–129, 717/149–151, 160
See application file for complete search history.

(56) References Cited

U.S. PATENT DOCUMENTS

| | | | | |
|---|---|---|---|---|
| 5,088,034 | A * | 2/1992 | Ihara et al. | 717/150 |
| 5,146,594 | A * | 9/1992 | Iitsuka | 717/156 |
| 5,230,053 | A * | 7/1993 | Zaiki | 717/150 |
| 5,870,607 | A * | 2/1999 | Netzer | 717/127 |
| 6,088,511 | A * | 7/2000 | Hardwick | 717/149 |
| 6,536,037 | B1 * | 3/2003 | Guheen et al. | 717/151 |
| 6,550,057 | B1 * | 4/2003 | Bowman-Amuah | 717/126 |
| 6,721,941 | B1 * | 4/2004 | Morshed et al. | 717/127 |
| 6,941,545 | B1 * | 9/2005 | Reese et al. | 717/130 |
| 6,954,923 | B1 * | 10/2005 | Yates et al. | 717/130 |
| 7,093,238 | B2 * | 8/2006 | Givoni et al. | 717/129 |
| 7,146,300 | B2 * | 12/2006 | Zammit et al. | 703/13 |
| 7,587,709 | B2 * | 9/2009 | Chilimbi et al. | 717/130 |
| 7,644,396 | B2 * | 1/2010 | Cohen | 717/129 |
| 7,676,795 | B2 * | 3/2010 | Elnozahy | 717/128 |
| 7,865,885 | B2 * | 1/2011 | Wu et al. | 717/151 |
| 7,917,895 | B2 * | 3/2011 | Givoni et al. | 717/124 |
| 8,146,071 | B2 * | 3/2012 | Silvera et al. | 717/160 |
| 8,181,168 | B1 * | 5/2012 | Lee et al. | 717/149 |

OTHER PUBLICATIONS

Seamons et al, "An efficient abstract interface for multidimensional array I/O", IEEE, pp. 650-659, 1994.*
Liu et al, "Optimizinig aggregate array computations in loops", ACM Trans. on Prog. Lang. & Sys. vol. 27, No. 1, pp. 91-125, 2005.*

(Continued)

Primary Examiner — Anil Khatri
(74) Attorney, Agent, or Firm — Greer, Burns & Crain, Ltd.

(57) ABSTRACT

A save data discrimination method saves calculation results including an element which is periodically saved when a computer executes a program repeating the same arithmetic process. The method includes analyzing a loop structure of the program from a source code of the program to detect a main loop of the arithmetic process repeated in the program and a sub-loop included in the main loop, determining a point of entrance to the main loop as a checkpoint that is a point for saving data of the calculation results, and analyzing the contents of the arithmetic process described in the main loop to identify reference-first elements which are elements only referred to and elements defined after being referred to as data to be saved at the checkpoint determined at the point of entrance.

9 Claims, 12 Drawing Sheets

OTHER PUBLICATIONS

Kim et al, "Improving perfromance of nested loops on reconfigurable array procesors", ACM Trans. on Arch. & Code Optimization, vol. 8, No. 4, article 32, pp. 1-23, 2012.*

Naik et al, "A checkpoint strategy for scalable recovery on distributed parallel systems", ACM, pp. 1-19, 1997.*

* cited by examiner

FIG. 1A
```
DO T=1,10000
   DO J=2,N-1
      DO I=2,N-1
         A(I,J)=···
      ENDDO
   ENDDO
   DO J=1,N
      DO I=1,N
         ···=A(I,J)
      ENDDO
   ENDDO
ENDDO
```
THIS ARITHMETIC PROCESS IS REPEATED 10000 TIMES
ARRAY A
ARRAY ELEMENTS IN N LOWS AND N COLUMNS
FIG. 1B
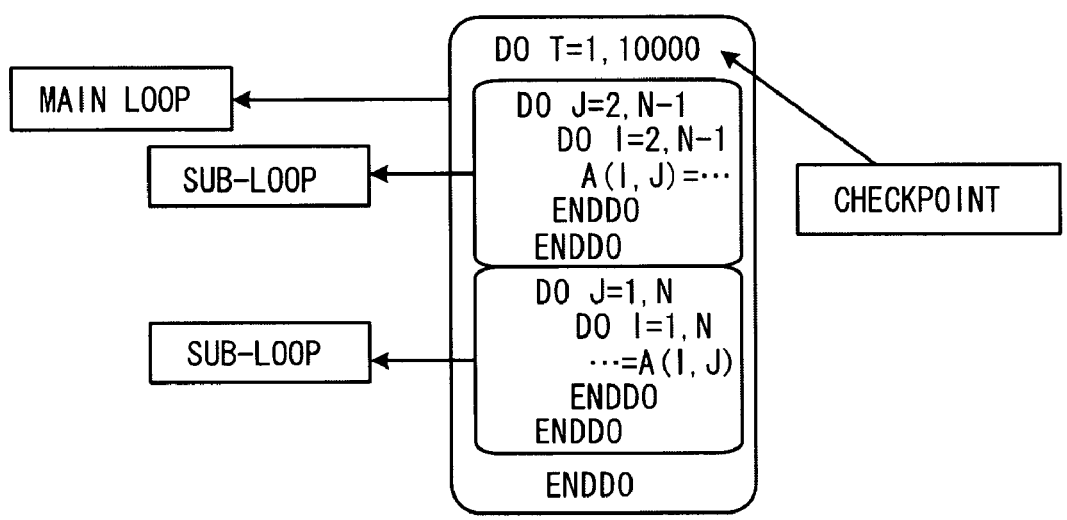
FIG. 1C
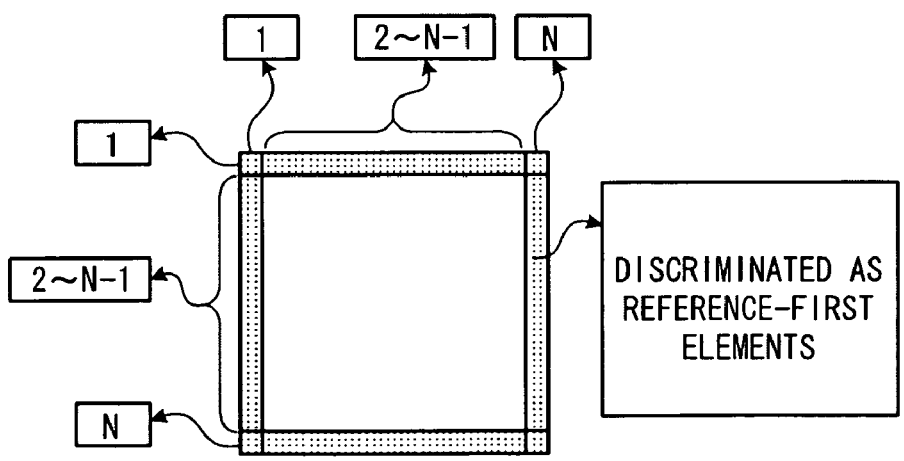

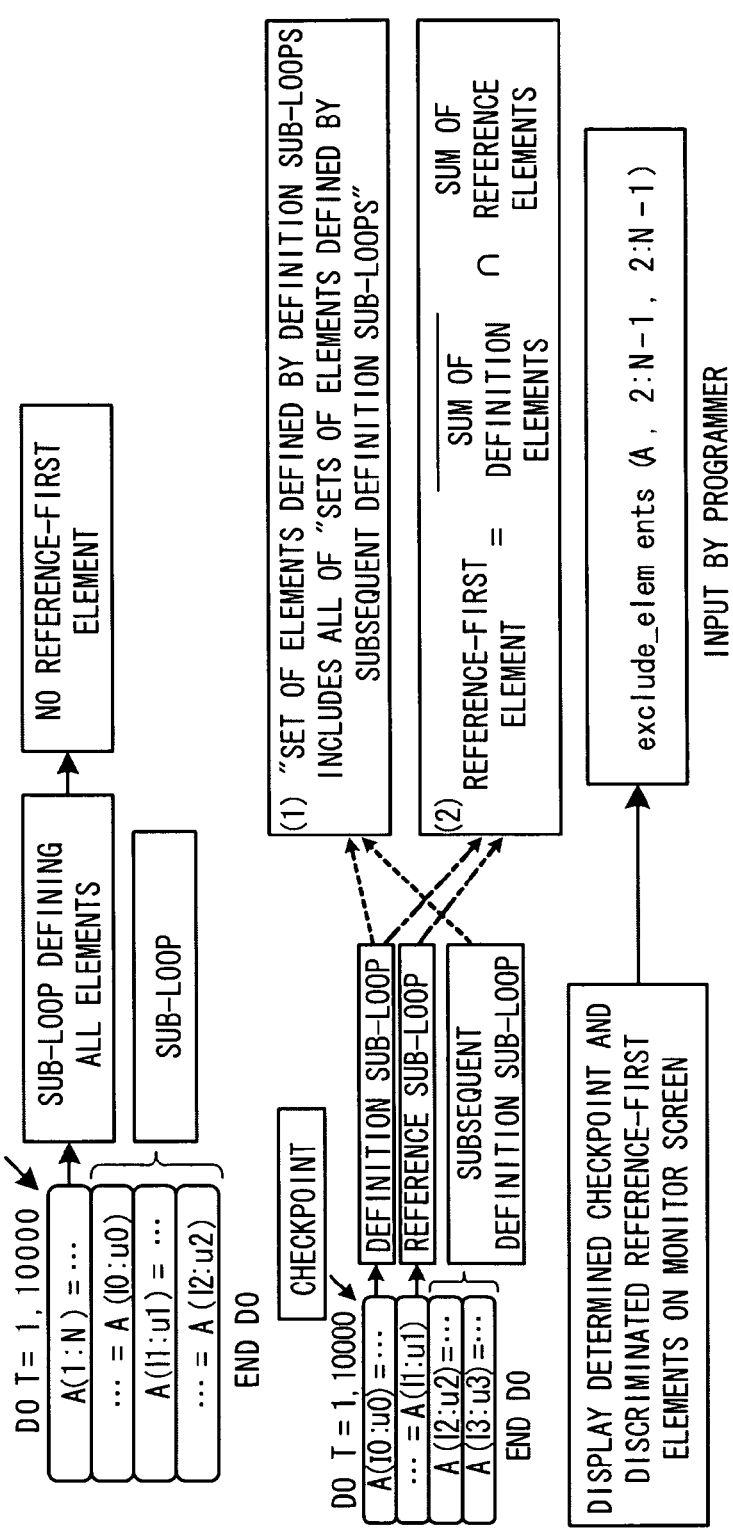

FIG. 3

```
loopLevel = 0
loopNestNo = 0
while (CURRENT LINE IS NOT EOF) then
  if (CURRENT LINE IS BEGINNING OF LOOP) then
    loopLevel = loopLevel + 1
    if (loopLevel == 1) then
      loopNestNo = loopNestNo+1
      loopNestStart(loopNestNo) = CURRENT LINE NUMBER
    endif
  else if (CURRENT LINE IS END OF LOOP) then
    LoopLevel = LoopLevel -1
    if (LoopLevel == 0) then
      loopNestEnd(loopNestNo)=CURRENT LINE NUMBER
    endif
  NEXT LINE BECOMES CURRENT LINE
endwhile
nLoopNests = LoopNestNo
```

ANALYZE SOURCE CODE OF PROGRAM TO:
(1) DETECT LOOP NESTS IN MAIN LOOP, NUMBER THE LOOP NESTS, AND SET START LINE AND END LINE OF EACH LOOP NEST IN ARRAYS loopNestStart AND loopNestEnd (2) SET THE NUMBER OF MAIN LOOP NESTS DETECTED IN nLoopNests

FIG. 4

```
function findSubLoopNests(loopNestNo, start, end)
    loopLevel = 0; subLoopNestNo = 0
    THE LINE FOLLOWING start BECOMES CURRENT LINE
    while (CURRENT LINE IS NOT end) then
        if (CURRENT LINE IS BEGINNING OF LOOP) then
            LoopLevel = LoopLevel + 1
            if (LoopLevel == 1) then
                subLoopNestNo = subLoopNestNo+1
                subLoopNestStart(loopNestNo, subLoopNestNo)=CURRENT LINE NUMBER
            endif
        else if (CURRENT LINE IS END OF LOOP) then
            LoopLevel = LoopLevel -1
            if (LoopLevel == 0) then
                subLoopNestEnd(loopNestNo, subLoopNestNo)=CURRENT LINE NUMBER
            endif
        endif
        NEXT LINE BECOMES CURRENT LINE
    endwhile
    return subLoopNestNo;
end function
```

ACTIONS TAKEN FOR LOOP NEST LoopNestNo OF MAIN LOOP
(1) SET START LINE OF SUB-LOOP NEST OF EACH SUB-LOOP IN THE MAIN LOOP IN ARRAY subLoopNestStart SIMILARLY, END LINE IS SET IN subLoopNestEnd
(2) THE NUMBER OF SUB-LOOP NESTS INCLUDED IN THE MAIN LOOP IS RETURNED AS RETURN VALUE

FIG. 5

```
loopLevel = 0
loopNestNo = 0
while (CURRENT LINE IS NOT EOF) then
    if (CURRENT LINE IS BEGINNING OF LOOP) then
        loopLevel = loopLevel + 1
        if (loopLevel == 1) then
            loopNestNo = loopNestNo+1
            loopNestStart(loopNestNo) = CURRENT LINE NUMBER
            SET CHECKPOINT IMMEDIATELY AFTER CURRENT LINE ⟵ SET CHECKPOINT IMMEDIATELY AFTER START LINE OF THE LOOP NEST OF DETECTED MAIN LOOP
        endif
    else if (CURRENT LINE IS END OF LOOP) then
        LoopLevel = LoopLevel -1
        if (LoopLevel == 0) then
            loopNestEnd(loopNestNo)=CURRENT LINE NUMBER
        endif
    NEXT LINE BECOMES CURRENT LINE
endwhile
nLoopNests = LoopNestNo
```

FIG. 6

```
function collectArrays2(No, start, end)
  nArrays = 0;
  LINE AFTER start BECOMES CURRENT LINE
  while (CURRENT LINE IS NOT end) then
    if (CURRENT LINE IS ASSIGNMENT STATEMENT) then
      ARRAY APPEARING ON LEFT SIDE OF ASSIGNMENT
      STATEMENT IS NAMED "A"
      if (n = find(A, No)) then
        if (kind(No, n) == REF) then
          kind(No, n) = DEFREF;
        endif
      else
        nArrays = nArrays + 1;array(No, nArrays) = A; kind(No, nArrays) = DEF;
      endif
      k ARRAYS APPEARING ON RIGHT SIDE OF ASSIGNMENT
      STATEMENTS ARE NAMED "A1, ... Ak"
      for i = 1 to k do
        if (n = find(Ai, No)) then
          if (kind(No, n) == DEF) then
            kind(No, n) = DEFREF;
          endif
        else
          nArrays = nArrays +1;array(No, nArrays)=Ai;kind(No, nArrays)=REF;
        endif
      endfor
    endif
  endwhile
  nArraysOfSubLoopNest(No) = nArrays;
end function
```

→ DEFINITION AND REFERENCE
⇒ DEFINITION ONLY
→ DEFINITION AND REFERENCE
⇒ REFERENCE ONLY (1) CATEGORIZE ARRAYS INCLUDED IN SUB LOOP NEST No INTO:
DEFINITION ONLY (kind(No, nArrays) is DEF)
REFERENCE ONLY (kind(No, nArrays) is REF)
BOTH DEFINITION AND REFERENCE (kind(No, nArrays) is DEFREF)

(2) SET THE NUMBER OF ARRAY NAMES INCLUDED IN SUB LOOP NEST No IN ARRAY ELEMENT "nArraysOfSubLoopNest(No)"

FIG. 7A

```
function analyzeArray1(A, nSubLoopNests)
   wasDefFound = 0;  wasRefFound = 0; areAllRefsAfterAllDefs = 1;
   for i = 1 to nSubLoopNests do
      if (j = find(A, i)) then
         if (kind(i, j) == DEF) then
            wasDefFound = 1;
            if (wasRefFound == 1) then
               areAllRefsAfterAllDefs = 0;
            endif
         else if (kind(i, j) == REF) then      FIRST PATTERN
            wasRefFound = 1;
         endif
      endif
   end for
   if (areAllRefsAfterAllDefs == 1) then
      return SAVE_PARTIAL1;
   else                                       DISCRIMINATE REFERENCE-FIRST
      return SAVE_UNKNOWN;                    ELEMENTS USING PARTIAL1
end function
```

FIG. 7B

```
function analyzePartial1(A, nSubLoopNests)
   elmDefs = Φ;
   elmRefs = Φ;
   for i = 1 to nSubLoopNests do
      if (j = find(A, i)) then
         if (kind(i, j) == DEF) then
            SET OF ELEMENTS DEFINED BY ARRAY A IN SUB LOOP NEST i IS
            IDENTIFIED AND NAMED "elmD"
            elmDefs = elmDefs ∪ elmD;
         else if (kind(i, j) == REF) then
            SET OF ELEMENTS REFERRED TO BY ARRAY A IN SUB LOOP NEST
            i IS IDENTIFIED AND NAMED "elmR"
            ElmRefs = elmRefs ∪ elmR;
         endif
      endif
   end for
   elmDefs ∩ elmRefs SAVE;
end function
```

FIG. 8

```
function analyzeArray2(A, nSubLoopNests)
   wasDefFound = 0;
   wasRefFound = 0;
   for i = 1 to nSubLoopNests do
      if (j = find(A, i)) then
         if (kind(i, j) == DEF) then
            if (wasDefFound == 0 AND wasRefFound == 0 AND  ["TOTAL NUMBER OF ELEMENTS IN ARRAY
                A EQUALS THE NUMBER OF ELEMENTS DEFINED"]
                return SAVE_NONE;
            endif
            wasDefFound = 1;/* SUB-LOOP NEST DEFINING ARRAY A WAS FOUND */
         else if (kind(i, j) == REF) then
            wasRefFound = 1;/* SUB-LOOP NEST REFERRING TO ARRAY A WAS FOUND */
         endif
      endif
   end for
   return SAVE_UNKNOWN;
end function
```

⇒ IT IS DETERMINED THAT "THERE IS NO REFERENCE-FIRST ELEMENT" BECAUSE ALL ELEMENTS ARE DEFINED FIRST

FIG. 9A

```
function analyzeArray3(A, nSubLoopNests)
   wasDefFound = 0;
   for i = 1 to nSubLoopNests do
      if (j = find(A, i)) then
         if (kind(i, j) == DEF) then
            if (wasDefFound == 0) then
               wasDefFound = 1;
               FIND RANGE W1 DEFINED BY ARRAY A
            else
               FIND RANGE W2 DEFINED BY ARRAY A
               if (W2 ⊆ W1) then
                  /* NO ACTION IS TAKEN */
               else
                  return SAVE_UNKNOWN;
               endif
            endif
         endif
      endif
   end for
   return SAVE_PARTIAL3;
end function
```

RANGE DEFINED BY SUBSEQUENT SUB-LOOPS IS INCLUDED IN RANGE DEFINED BY DEFINITION SUB-LOOP

DISCRIMINATE REFERENCE-FIRST ELEMENTS USING PARTIAL3

FIG. 9B

```
function analyzePartial3(A, nSubLoopNests)
   elmDefs = Φ;
   elmRefs = Φ;
   for i = 1 to nSubLoopNests do
      if (j = find(A, i)) then
         if (kind(i, j) == DEF) then
            SET OF ELEMENTS DEFINED BY ARRAY A IN SUB LOOP NEST i
               IS IDENTIFIED AND NAMED "elmD"
            elmDefs = elmDefs ∪ elmD;
         else if (kind(i, j) == REF) then
            SET OF ELEMENTS REFERRED TO BY ARRAY A IN SUB LOOP
               NEST i IS IDENTIFIED AND NAMED "elmR"
            ElmRefs = elmRefs ∪ elmR;
         endif
      endif
   end for
   elmDefs ∩ elmRefs SAVE;
end function
```

METHOD AND APPARATUS FOR SAVING CHECKPOINT DATA WHILE DETECTING AND ANALYZING A LOOP STRUCTURE

The present invention relates to a save data discrimination method, a save data discrimination apparatus and a computer-readable medium storing a save data discrimination program.

BACKGROUND

When a program involving repetition of the same arithmetic process, e.g., the same technological calculation is executed, it has been common to save the data of calculation results periodically to retain the data in order to cope with failures of the computer executing the arithmetic process.

The computer executing the arithmetic process periodically saves the data of calculation results to retain the data according to a setting made by a user. For example, when a computer performs an arithmetic process by executing a program involving a calculation repeated in 10000 loops, the computer saves the data of the result of every 100-th calculation to retain the data according to a setting made by a user.

Therefore, even when a failure occurs at the computer in the 510-th loop of the arithmetic process, the computer can use the data of the result of the 500-th calculation which has been saved and retained. Thus, the arithmetic process can be re-started from the calculation at the 501-th loop instead of the calculation at the first loop.

SUMMARY

According to an aspect of an embodiment, there is provided a save data discrimination method for discriminating data of calculation results including an element which is periodically saved when a computer executes a program repeating the same arithmetic process. The method includes: a loop structure detection step for analyzing a loop structure of the program from a source code of the program to detect a main loop of the arithmetic process repeated in the program and a sub-loop included in the main loop. A checkpoint determination step determines a point of entrance to the main loop detected at the loop structure detection step as a checkpoint that is a point for saving data of the calculation results, and a reference-first element discrimination step analyzes the contents of the arithmetic process described in the main loop detected at the loop structure detection step to discriminate reference-first elements which are elements only referred to and elements defined after being referred to as data to be saved at the checkpoint determined at the checkpoint determination step.

BRIEF DESCRIPTION OF THE DRAWINGS

FIGS. 1A to 1G are illustrations for explaining the outlines and features of a save data discrimination apparatus;

FIG. 3 is an illustration for explaining a loop structure detection section;

FIG. 4 is an illustration for explaining the loop structure detection section;

FIG. 5 is an illustration for explaining a checkpoint determination section;

FIG. 6 is an illustration for explaining a reference-first element discrimination section;

FIGS. 7A and 7B are illustrations for explaining the reference-first element discrimination section;

FIG. 8 is an illustration for explaining the reference-first element discrimination section;

FIG. 9A and 9B are illustrations for explaining the reference-first element discrimination section;

EMBODIMENT

Figure 2:
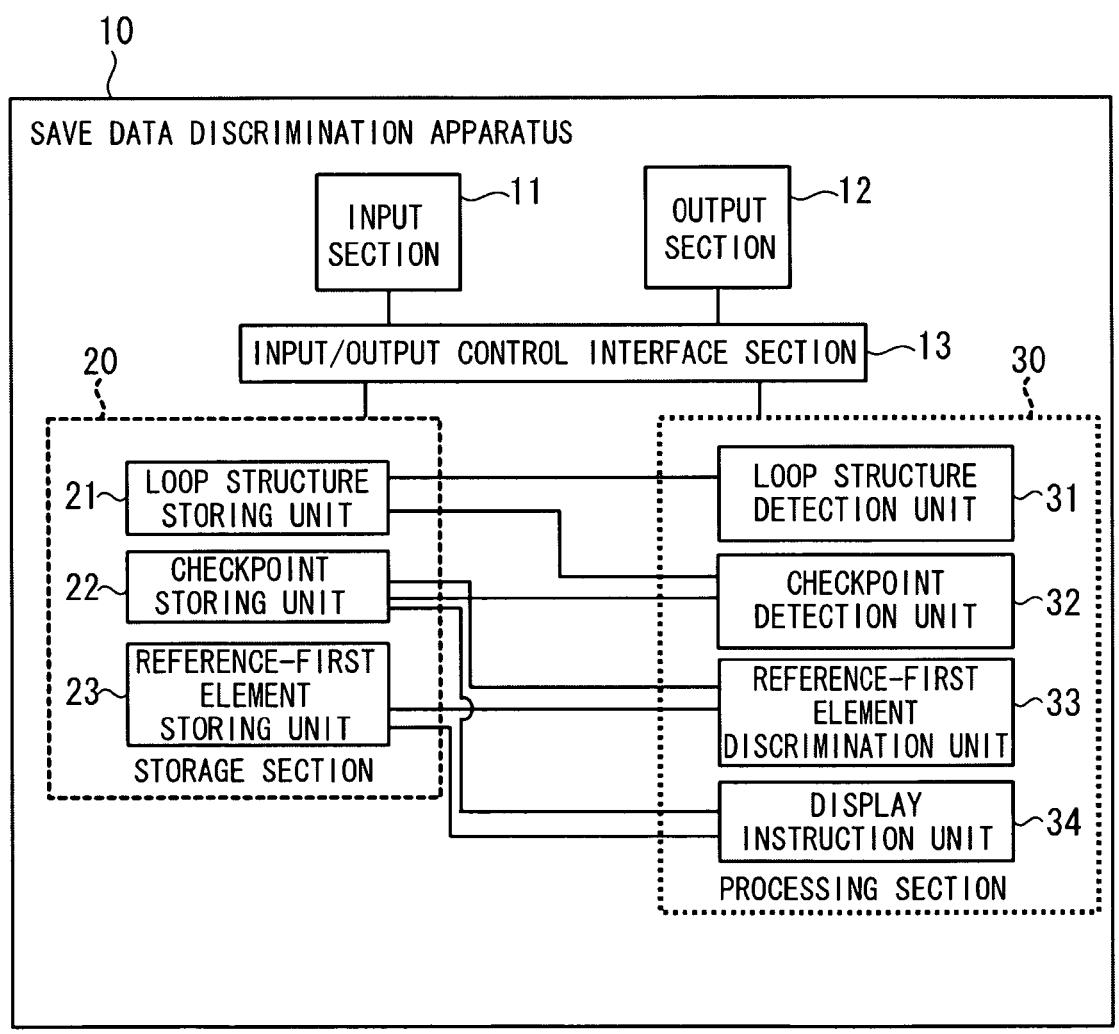
FIG. 2 is a block diagram showing a configuration of the save data discrimination apparatus.

According to the above-described technique in the related art, a user saves all data of calculation results at a preset point in time to retain the data, which has resulted in a problem in that the data can be saved only in an inefficient manner because heavy loads are placed on the process of transferring the data.

Specifically, let us assume that data of calculation results to be saved at a checkpoint which is a point for saving data set in a program is of an enormous amount of data such as data of variables having array elements in two or more dimensions. Then, data transfer takes a long time if the entire data is to be saved and retained, and a problem has therefore arisen in that the data can be saved only in an inefficient manner.

The present embodiment will show examples of a save data discrimination method, a save data discrimination program, and a save data discrimination apparatus which allow data to be saved efficiently.

An embodiment of a save data discrimination method, a save data discrimination program, and a save data discrimination apparatus according to the invention will now be described in detail with reference to the accompanying drawings.

[Outline and Features of Save Data Discrimination Apparatus]

Major features of the save data discrimination apparatus will be specifically described with reference to FIGS. 1A to 1G. FIGS. 1A to 1G are illustrations for explaining the outline and features of the save data discrimination apparatus.

The save data discrimination apparatus discriminates data of calculation results including elements which are to be periodically saved when a computer executes a program involving repetition of the same arithmetic process.

For example, let us assume that a computer executes a program involving 10000 repetitions of an arithmetic process in which a calculation is performed using array elements in N rows and N columns (an array A) and that calculation results are stored in the array A again as shown in FIG. 1A. Then, the save data discrimination apparatus discriminates data to be saved periodically (for example, after every 100-th calculation) among the elements of the array A in which calculation results are stored.

The present embodiment is primarily characterized in that it allows data to be efficiently saved. This feature can be briefly described as follows. The save data discrimination apparatus of the present embodiment analyzes a loop structure of a program from the source code of the program to detect a main loop of an arithmetic process repeated in the program and a sub-loop included in the main loop.

For example, as shown in FIG. 1B, the save data discrimination apparatus analyzes a loop structure of a program and detects a main loop (a loop represented by "DO T=1, 10000~ENDDO") of the arithmetic process repeated in the program and two sub-loops (a loop represented by "DO J=2, N−1~ENDDO" and a loop represented by "DO J=1, N~ENDDO") included in the main loop.

The save data discrimination apparatus determines a point where the detected main loop is entered as a checkpoint that is a point where data of calculation results are saved. For example, as shown in FIG. 1B, a point immediately after a line "DO T=1, 10000" that is the start line of the main loop of the program is determined as the checkpoint where data of calculation results stored in the array A are to be saved.

The save data discrimination apparatus of the present embodiment analyzes the contents of arithmetic processes described in the main loop thus detected and discriminates only reference-first elements, i.e., elements which are only referred to and elements which are defined after being referred to as data to be saved at the checkpoint thus determined.

For example, the analysis of the contents of the arithmetic processes described in the detected main loop indicates that the arithmetic process in the first sub-loop is an arithmetic process for defining elements in a range specified to extend "from the second row to the (N–1)-th row" and "from the second column to the (N–1)-th column" of the array A (the unshaded range in FIG. 1C) because A(I, J) is shown on the left side in FIG. 1B. It will be also understood that the arithmetic process in the second sub-loop is an arithmetic process in which all elements in the array A are referred to because the A(I, J) is shown on the right side.

Thus, the save data discrimination apparatus discriminates the shaded ranges shown in FIG. 1C as elements which are only referred to and elements within those ranges as reference-first elements which are data to be saved at a predetermined checkpoint.

Specifically, the save data discrimination apparatus analyzes the contents of an arithmetic process in each of a plurality of sub-loops included in a main loop which has been detected and discriminates reference-first elements in each case falling under any of the following three patterns.

The save data discrimination apparatus analyzes the contents of an arithmetic process in each of a plurality of sub-loops included in a main loop which has been detected. Let us assume that a definition sub-loop, which is a sub-loop of an arithmetic process defining elements, appears once or plural times, and a reference sub-loop, which is a sub-loop of an arithmetic process referring to elements, appears once or plural times thereafter. Then, the intersection of the complement of the sum of the elements defined by every definition sub-loop and the sum of the elements referred to by every reference sub-loop is discriminated as reference-first elements.

For example, let us assume that two definition sub-loops, i.e., "a sub-loop having A(I0:u0) on the left side" and "a sub-loop having A(I1:u1) on the left side" appear, and three reference sub-loops, i.e., "a sub-loop having A (I2:u2) on the right side", "a sub-loop having A(I3:u3) on the right side", and "a sub-loop having A(I5:u5) on the right side" appear thereafter, as shown in FIG. 1D. Then, the intersection of "the complement of the sum of the elements defined by all of the definition sub-loops (definition elements)" and "the sum of the elements referred to by all of the reference sub-loops (reference elements)" is discriminated as reference-first elements.

When the save data discrimination apparatus analyzes the contents of an arithmetic process in each of a plurality of sub-loops included in a detected main loop and finds that a sub-loop of an arithmetic process defining all elements appears first, the apparatus determines that there is no element to be categorized as a reference-first element.

For example, when "a sub-loop having A(1:N) on the left side" which is a definition sub-loop defining all elements appears first as shown in FIG. 1E, the save data discrimination apparatus determines that there is no element to be categorized as a reference-first element regardless of the pattern in which subsequent definition sub-loops and reference sub-loops appear.

Let us assume that the save data discrimination apparatus analyzes the contents of an arithmetic process in each of a plurality of sub-loops included in a detected main loop and finds that a definition sub-loop appears once or plural times; a reference sub-loop thereafter appears once or plural times; and a subsequent definition sub-loop which is a sub-loop of an arithmetic process defining elements further appears once or plural times. Then, if all of the elements defined by every subsequent definition sub-loop are included in all of the elements defined by every definition sub-loop, the apparatus discriminates the intersection of the complement of the sum of the elements defined by every definition sub-loop and the sum of the elements referred to by every reference sub-loop as reference-first elements as described above.

For example, let us assume that "a sub-loop having A(I0:u0) on the left side" which is a definition sub-loop appears; "a sub-loop having A(I1:u1) on the right side" which is a reference sub-loop of an arithmetic process referring to elements appears thereafter; and two subsequent definition sub-loops, i.e., "a sub-loop having A(I2:u2) on the left side" and "a sub-loop having A(I3:u3) on the left side" further appear, as shown in FIG. 1F. Then, if "the elements defined by the first definition sub-loop" include all of "the elements defined by the subsequent definition sub-loops" (see (1) of FIG. 1F), the save data discrimination apparatus excludes the subsequent definition sub-loops from the object of discrimination and discriminates the intersection of "the complement of the sum of the elements defined by every definition sub-loop (definition elements)" and "the sum of the elements referred to by every reference sub-loop (reference elements)" as reference-first elements (see (2) of FIG. 1F).

As shown in FIGS. 1D, 1E, and 1F, the save data discrimination apparatus determines a point immediately after "DO T=1, 10000" as a checkpoint in all programs.

The save data discrimination apparatus gives an instruction to display a checkpoint thus determined and reference-first elements thus discriminated on a monitor screen or the like. For example, a checkpoint thus determined and reference-first elements as shown in FIG. 1C are displayed on a monitor screen. With reference to the display, a programmer can give an instruction for saving elements excluding the unshaded range in FIG. 1C (i.e., only reference-first elements) by inputting "exclude_elements (A, 2:N–1, 2:N–1)" in the program as shown in FIG. 1G.

Although the present embodiment has been described as a case in which an analysis is made on each of three patterns as described above, the invention is not limited to such cases, and an analysis may be made on an arbitrary pattern selected from along the three patterns. For example, reference-first elements may be discriminated by executing an analysis only to determine whether the contents of processes in sub-loops included in a main loop of an input program fall upon the pattern shown in FIG. 1D.

As thus described, the save data discrimination apparatus of the present embodiment saves only reference-first elements which are the minimum data required for restarting execution of a program instead of saving all calculation results. Therefore, the amount of data saved can be reduced, and data can be saved efficiently.

[Configuration of Save Data Discrimination Apparatus]

The save data discrimination apparatus of the present embodiment will now be described with reference to FIGS. 2 to 9B. FIG. 2 is a block diagram showing a configuration of the save data discrimination apparatus of the present embodiment. FIGS. 3 and 4 are illustrations for explaining a loop structure detection unit in the present embodiment. FIG. 5 is an illustration for explaining a checkpoint determination unit in the present embodiment. FIGS. 6 to 9B are illustrations for explaining a reference-first element discrimination unit in the present embodiment.

As shown in FIG. 2, a save data discrimination apparatus 10 of the present embodiment includes an input section 11, an output section 12, an input/output control interface section 13, a storage section 20, and a processing section 30.

The input section 11 is used for inputting various types of information. For example, it may be a keyboard or a touch panel which is used to input a source code of a program used for various processes performed by the processing section 30 and inputting a request for discrimination of data to be saved.

The output section 12 outputs various types of information. For example, it may be a screen. Results of processes at a checkpoint determination unit 32 (which will be described later) and a reference-first element discrimination unit 33 (which will be described later) may be displayed on a monitor screen according to an instruction from a display instruction unit 34 (which will be describe later).

The input/output control interface section 13 controls data transfer between the input section 11 and the output section 12 and between the storage section 20 and the processing section 30.

The storage section 20 is used to store results of various processes performed by the processing section 30. As shown in FIG. 2, the section includes a loop structure storing unit 21, a checkpoint storing unit 22, and a reference-first element storing unit 23. Details of each unit will be described later.

The processing section 30 executes various processes based on a source code of a program transferred from the input/output control interface section 13. As shown in FIG. 2, the section includes a loop structure detection unit 31, a checkpoint determination unit 32, a reference-first element discrimination unit 33, and a display instruction unit 34. Details of each unit will be described later.

The loop structure detection unit 31 analyzes a loop structure of a program input thereto from a source code of the program to detect a main loop of an arithmetic process repeated in the program and sub-loops included in the main loop and stores results of the detection in the loop structure storing unit 21. Specifically, as a first step, a main loop of an input program is detected from a source code of the program according to the method of analysis shown in FIG. 3. As shown in FIG. 3, a statement described in the program is analyzed one line at a time up to the end line (EOF). Each time a loop line is started, "loopLevel" is incremented by one (the initial value is 0), and "loopLevel" is decremented by one each time a loop line ends. Lines of a statement at "loopLevel" of "1" are the start line and the end line of the main loop. The start line and the end line of each loop nest are set in arrays "loopNestStart" and "loopNestEnd", respectively (see (1) in FIG. 3). Each time the start line of the main loop is detected, "loopNestNo" is incremented (the initial value is 0), and the total count is set in "nLoopNests" as the number of loop nests in the main loop (see (2) in FIG. 3). Thus, the line at which each main loop is started and the line at the main loop ends are detected.

The loop structure detecting unit 31 detects sub-loops in the main loop detected from the source code of the input program according to the method of analysis shown in FIG. 4 as a second step. Specifically, as shown in FIG. 4, a statement described from the line following the start line (start) of the main loop is analyzed one line at a time up to the line preceding the end line (end) of the main loop. Loop nests of sub-loops having "loopLevel" of "1" are detected using the same method as used for detecting the main loop, and the start line and end line of each loop nest are set in arrays "subloopNestStart" and "subloopNestEnd", respectively (see (1) in FIG. 4). The number of sub-loop nests thus detected is set in "subLoopNestNo" (see (2) in FIG. 4). Thus, detection is performed for each sub-loop to find the line at which the sub-loop starts and the line at which the sub-loop ends.

The checkpoint determination unit 32 determines the point of entrance to the main loop detected by the loop structure detection unit 31 as a checkpoint that is a point for saving data of calculation results, and the unit stores the result of determination in the checkpoint storing unit 22. Specifically, as shown in FIG. 5, a checkpoint is set immediately after the start line of the loop nest of the main loop detected. The description of the program is omitted in FIG. 5 because it is similar to that in FIG. 3.

The reference-first element discrimination unit 33 analyzes the contents of arithmetic processes described in the main loop detected by the loop structure detection unit 31. The unit discriminates which are reference-first elements which are elements referred to only and elements defined after being referred to as data to be saved at the checkpoint determined by the checkpoint determination unit 32 and stores the result of discrimination in the reference-first element storing unit 23.

Specifically, the reference-first element discrimination unit 33 analyzes the contents of the arithmetic processes described in the sub-loops included in the detected main loop according to the method of analysis shown in FIG. 6 as a first step. As shown in FIG. 6, the arithmetic processes in the sub-loops are analyzed to collect all arrays used in each of the arithmetic processes. The arrays are categorized into arrays "definition only (kind (No, nArrays) is DEF)" appearing only on the left side, arrays "reference only (kind (No, nArrays) is REF)" appearing only on the right side, and arrays "both definition and reference (kind (No, nArrays) is DEFREF)" appearing on both of the right and left sides (see (1) in FIG. 6). The number of the names of arrays included in each of the sub-loops analyzed is set in an array element "nArraysOfSubLoopNest (No)" (see (2) in FIG. 6).

The reference-first element discrimination unit extracts arrays appearing on the left side (arrays which are defined) and determines whether they also appear on the right side. When the arrays appear also on the right side, they are categorized as arrays "(kind (No, nArrays)=DEFREF)" which are both defined and referred to. When the arrays do not appear on the right side, they are categorized as arrays "(kind (No, nArrays)=DEF)" which are only defined. The unit extracts arrays appearing on the right side (arrays which are referred to) and determines whether they also appear on the left side. When the arrays appear also on the left side, they are categorized as arrays "(kind (No, nArrays)=DEFREF)" which are both defined and referred to. When the arrays do not appear on the left side, they are categorized as arrays "(kind (No, nArrays)=REF) which are only referred to. In the example shown in FIG. 6, each main loop nest is analyzed from the line following the start line (start) of the main loop nest up to the line preceding the end (end) of the same.

The reference-first element discrimination unit 33 discriminates, as the second step, reference-first elements in each case of following three patterns based on the arrays (DEF, REF, DEFREF) categorized in each sub-loop in the first step.

The reference-first element discrimination unit 33 analyzes, in the case of the first pattern, the contents of an arithmetic process in each of a plurality of sub-loops included in the main loop detected. Let us assume that a definition sub-loop, which is a sub-loop of an arithmetic process defining elements, appears once or plural times and that a reference sub-loop which is a sub-loop of an arithmetic process referring to elements appears once or plural times thereafter. Then, the intersection of the complement of the sum of the elements defined by all of the definition sub-loops and the sum of the elements referred to by all of the reference sub-loops are discriminated as reference-first elements.

Specifically, the analyzing process (analyzeArray1) shown in FIG. 7A is executed. When the array appearing in each sub-loop has a pattern "AllRefsAfterAllDefs" in which a set of consecutive references (AllRefs) follows a set of consecutive definitions, "discriminate reference-first elements using PARTIAL1" is given. Then, the analyzing process (analyzepartial1) shown in FIG. 7B is executed to obtain reference-first elements. Specifically, the intersection of "the complement of elmDefs" and "elmRefs" is obtained as reference-first elements.

That is, when the array has a pattern in which a set of consecutive references follows a set of consecutive definitions, "areAllRefsAfterAllDefs==1" is given as shown in FIG. 7A to derive "SAVE_PARTIAL1", and the process proceeds to the analysis "analyzePartial1". Then, as shown in FIG. 7B, a set of elements defined by the sub-loop nest among the elements in the array A is identified as "elmD", and a set of elements referred to by the sub-loop nest among the elements in the array A is identified as "elmR". The intersection of "the complement of elmDefs" and "elmRefs" is discriminated as reference-first elements to be saved. When the array does not have the above-described pattern, "areAllRefsAfterAllDefs=0" is given as shown in FIG. 7A. Then, it is concluded that "no element to save has been discriminated (SAVE_UNKNOWN)", and the process is terminated.

In the case of the second pattern, the reference-first element discrimination unit 33 analyzes the contents of the arithmetic process in each of sub-loops included in the main loop detected and finds that a sub-loop of an arithmetic process defining all elements appears first. The section determines that there is no element to be categorized as a reference-first element.

Specifically, the analyzing process shown in FIG. 8 (analyzeArray2) is executed. For example, when the pattern of the array A appearing in the first sub-loop is constituted by definitions and "the total number of elements in the array A is equal to the number of elements defined", "SAVE_NONE" is returned, and it is determined that "there is no reference-first element". When the array does not have the above-described pattern, it is concluded that "no element to save has been discriminated (SAVE_UNKNOWN)" as shown in FIG. 8, and the process is terminated.

In the case of the third pattern, the reference-first element discrimination unit 33 analyzes the contents of the arithmetic process in each of sub-loops included in the main loop detected and finds that a definition sub-loop appear once or plural times; a reference sub-loop thereafter appear once or plural times; and a subsequent definition sub-loop which is a sub-loop of an arithmetic process defining elements further appears once or plural times. Then, if all of the elements defined by the subsequent definition sub-loops are included in all of the elements defined by the definition sub-loops, the intersection of the complement of the sum of the elements defined by all of the definition sub-loops and the sum of the elements referred to by all of the reference sub-loops is discriminated as the reference-first elements.

Specifically, the analyzing process shown in FIG. 9A (analyzeArray3) is executed to find "a range (W1) defined by the definition sub-loops" and "a range (W2) defined by the subsequent definition sub-loops" in the arrays appearing in each sub-loop. When "the range W2 is included in the range W1", "no action is taken" for the range "W2", and "SAVE_PARTIAL3" is returned. The process then proceeds to the execution of an analysis "analyzePartial3" on the range "W1". Specifically, as shown in FIG. 9B, a set of elements defined by the sub-loop nest among the elements in the array A is identified as "elmD", and a set of elements referred to by the sub-loop nest among the elements in the array A is identified as "elmR". The intersection of "the complement of elmDefs" and "elmRefs" is determined as reference-first elements to be saved. When the array does not have the above-described pattern, it is concluded that "no element to save has been discriminated (SAVE_UNKNOWN)" as shown in FIG. 9A, and the process is terminated.

The display instruction unit 34 provides an instruction to display the checkpoint thus determined and stored in the checkpoint storing unit 22 and the reference-first elements discriminated by the reference-first element discrimination unit 33 on the monitor screen. For example, the determined checkpoint and the reference-first elements shown in FIG. 1C are displayed on the monitor screen. By referring to the display, as shown in FIG. 1G, a programmer can input "exclude_elements (A, 2:N−1, 2:N−1)" in the program to give an instruction for saving elements excluding those in the unshaded range in FIG. 1C.

Although the present embodiment has been described as a case in which the reference-first element discrimination unit 33 executes all of the analyzing processes shown in FIGS. 7A to 9B, the invention is not limited to such a case. For example, the reference-first element discrimination unit 33 may execute only the analyzing process shown in FIG. 7A (analyzeArray1) to discriminate reference-first elements, and the reference-first element discrimination unit 33 may execute arbitrary analyzing processes depending on the setting of the same. When all arithmetic processes in a sub-loop involve references only, all array elements are discriminated as reference-first elements.

[Steps of the Process of the Save Data Discrimination Apparatus]

Figure 10:
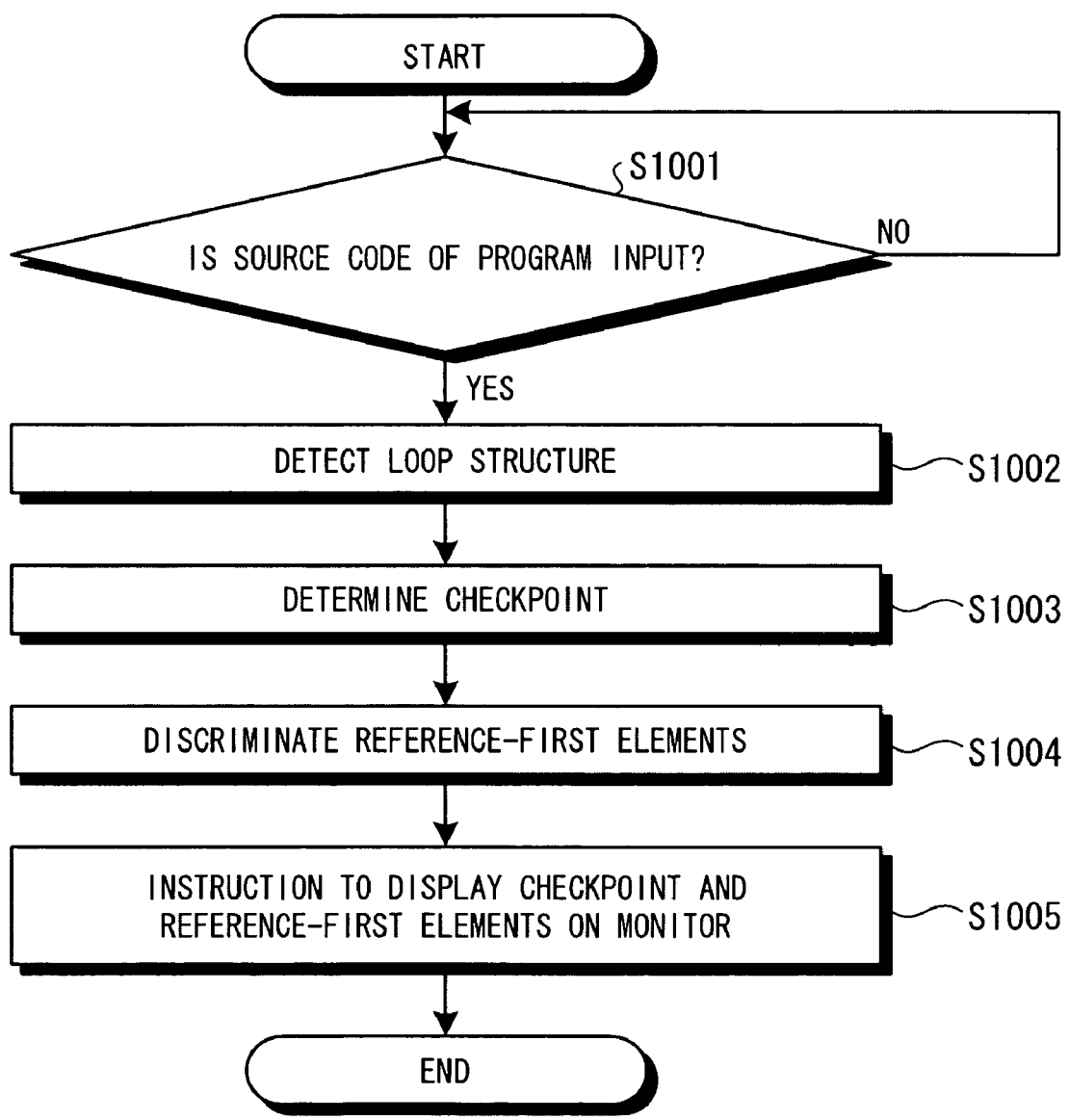
FIG. 10 is a flow chart for explaining processes performed by the save data discrimination apparatus.

The process performed by the save data discrimination apparatus 10 of the first embodiment will now be described with reference to FIG. 10. FIG. 10 is a flow chart for explaining steps of the process performed by the save data discrimination apparatus 10 of Embodiment 1.

First, when the save data discrimination apparatus 10 of Embodiment 1 receives input of a source code of a program (step S1001: Yes), the loop structure detection unit 31 analyzes a loop structure of the input program from the source code of the program to detect a main loop of an arithmetic process repeated in the program and sub-loops included in the main loop (step S1002).

Specifically, the analysis shown in FIG. 3 is carried out as a first step to detect a main loop of the input program from the source code of the program, and the analysis shown in FIG. 4 is carried out as a second step to detect sub-loops in the detected main loop.

The checkpoint determination unit 32 determines a point of entrance to the main loop detected by the loop structure detection unit 31 as a checkpoint that is a point for saving data of calculation results (step S1003). As shown in FIG. 5, a checkpoint is set immediately after the start line of a loop nest of the detected main loop.

Further, the reference-first element discrimination unit 33 analyzes the contents of arithmetic processes described in the main loop detected by the loop structure detection unit 31. The unit 33 discriminates reference-first elements, i.e., elements which are only referred to and elements which are defined after being referred to as data to be saved at the checkpoint determined by the checkpoint determination unit 32 (step S1004).

Specifically, the reference-first element discrimination unit 33 executes the analyzing process shown in FIG. 7A (analyzeArray1). When the array has the relevant pattern, the analyzing process shown in FIG. 7B (analyzePartial1) is subsequently executed to identify reference-first elements. That is, the intersection of "the complement of elmDefs" and "elmRefs" is obtained as reference-first elements.

The reference-first element discrimination unit 33 executes the analyzing process (analyzeArray2) shown in FIG. 8. When the array has the relevant pattern, it determines that "there is no reference-first element".

The reference-first element discrimination unit 33 executes the analyzing process shown in FIG. 9A (analyzeArray3) When the array has the relevant pattern, the analyzing process shown in FIG. 9B (analyzePartial3) is subsequently executed to identify reference-first elements. That is, the intersection of "the complement of elmDefs" and "elmRefs" is obtained as reference-first elements.

The display instruction unit 34 gives an instruction to display the checkpoint determined as thus described and stored in the checkpoint storing unit 22 and the reference-first elements discriminated by the reference-first element discrimination unit 33 on the monitor screen (step S1005), and the process is terminated. For example, the determined checkpoint and the reference-first elements shown in FIG. 1C are displayed on the monitor screen. By referring to the display, as shown in FIG. 1G, a programmer can input, for example, "exclude_elements (A, 2:N−1, 2:N−1)" in the program to give an instruction for saving elements excluding those in the unshaded range in FIG. 1C.

As described above, in the present embodiment, a loop structure of a program is analyzed from a source code of the program; a main loop of an arithmetic process repeated in the program and sub-loops included on the main loop are detected; a point of entrance to the detected main loop is determined as a checkpoint where data of calculation results are to be saved; and the contents of the arithmetic process described in the detected main loop is analyzed to discriminate reference-first elements including elements which are only referred and elements which are defined after being referred to as data to be saved at the determined checkpoint. As a result, only reference-first elements which are minimum data required for restarting the execution of the program are saved instead of saving all calculation results. It is therefore possible to reduce the amount of data saved and to save data efficiently.

Let us assume that an analysis executed according to the present embodiment on the contents of an arithmetic process in each of a plurality of sub-loops included in a detected main loop provides the following results. A definition sub-loop which is a sub-loop of an arithmetic process defining elements appears once or plural times, and a reference sub-loop which is a sub-loop of an arithmetic process referring to elements thereafter appears once or plural times. Then, the intersection of the complement of the sum of the elements defined by all of the definition sub-loops and the sum of the elements referred to by all of the reference sub-loops is discriminated as reference-first elements. Thus, reference-first elements can be automatically discriminated through an analysis of a source code of a program without requiring a programmer to discriminate the reference-first elements. In addition, the program may be re-compiled by rewriting the source code of the same such that the discriminated reference-first elements are saved at, for example, a predetermined checkpoint to allow the data to be efficiently saved.

When an analysis according to the present embodiment on the contents of an arithmetic process in each of sub-loops included in a detected main loop indicates that a sub-loop of an arithmetic process defining all elements appears first, it is determined that there is no element categorized as a reference-first element. Therefore, the program can be easily discriminated as a program having no data to be saved, which allows efficient data saving.

Let us assume that an analysis performed according to the present embodiment on the contents of an arithmetic process in each of a plurality of sub-loops included in a detected main loop provides the following results. A definition sub-loop appears once or plural times; a reference sub-loop thereafter appears once or plural times; and a subsequent definition sub-loops, which is a sub-loop of an arithmetic process defining elements, further appears once or plural times. If all of the elements defined by the subsequent definition sub-loop(s) are included in all of the elements defined by the definition sub-loop(s), the intersection of the complement of the sum of the elements defined by every definition sub-loop and the sum of the elements referred to by every reference sub-loop is discriminated as reference-first elements. Thus, reference-first elements can be automatically discriminated through an analysis of a source code of a program without requiring a programmer to discriminate the reference-first elements. In addition, the program may be re-compiled by rewriting the source code of the same such that the discriminated reference-first elements are saved at, for example a predetermined checkpoint to allow the data to be efficiently saved.

In the present embodiment, an instruction is given to display a checkpoint determined as thus described and reference-first elements discriminated as thus described on a predetermined output unit. Therefore, for example, a programmer can check reference-first elements which have been automatically discriminated and can easily determine whether the reference-first elements include "elements to be saved" or "elements which are not required to be saved" according to the programmer's own discrimination. Thus, data can be efficiently saved.

Among the processes described in the above embodiment, all or some of the processes described as automatic operations may alternatively be manually performed. For example, the display instruction unit 34 may cause a checkpoint and reference-first elements determined and discriminated as thus described to be displayed according to a request for display from a user instead of providing an instruction for automatic display of the determined checkpoint and the discriminated reference-first elements. Alternatively, all or some of the processes described as manual operations may be automatically performed according to a known method. Unless otherwise specified, modifications may be arbitrarily made to the processing steps, specific designations, and information including various parameters and data shown in the above description and the accompanying drawings, such modifications including, for example, simultaneous execution of the steps S1002 and S1003 shown in FIG. 10.

The constituent elements of the illustrated units are shown to represent their functions conceptually. It is not essential that those elements have physical configurations as illustrated. Specifically, the processing units and storage units are not limited to the specific forms of distribution or integration of the same illustrated above (e.g., the form shown in FIG. 2). For example, all or some of the units may be distributed or integrated into arbitrary functional or physical units (e.g., the loop structure detection unit 31 and the checkpoint determination unit 32 may be integrated) in alternative ways depending on various types of loads acting on the units and the state of use of the units. All or any part of the processing functions of each unit may be carried out by a CPU and a program analyzed and executed by the CPU, and they may alternatively be carried out by hardware using wired logics.

Figure 11:
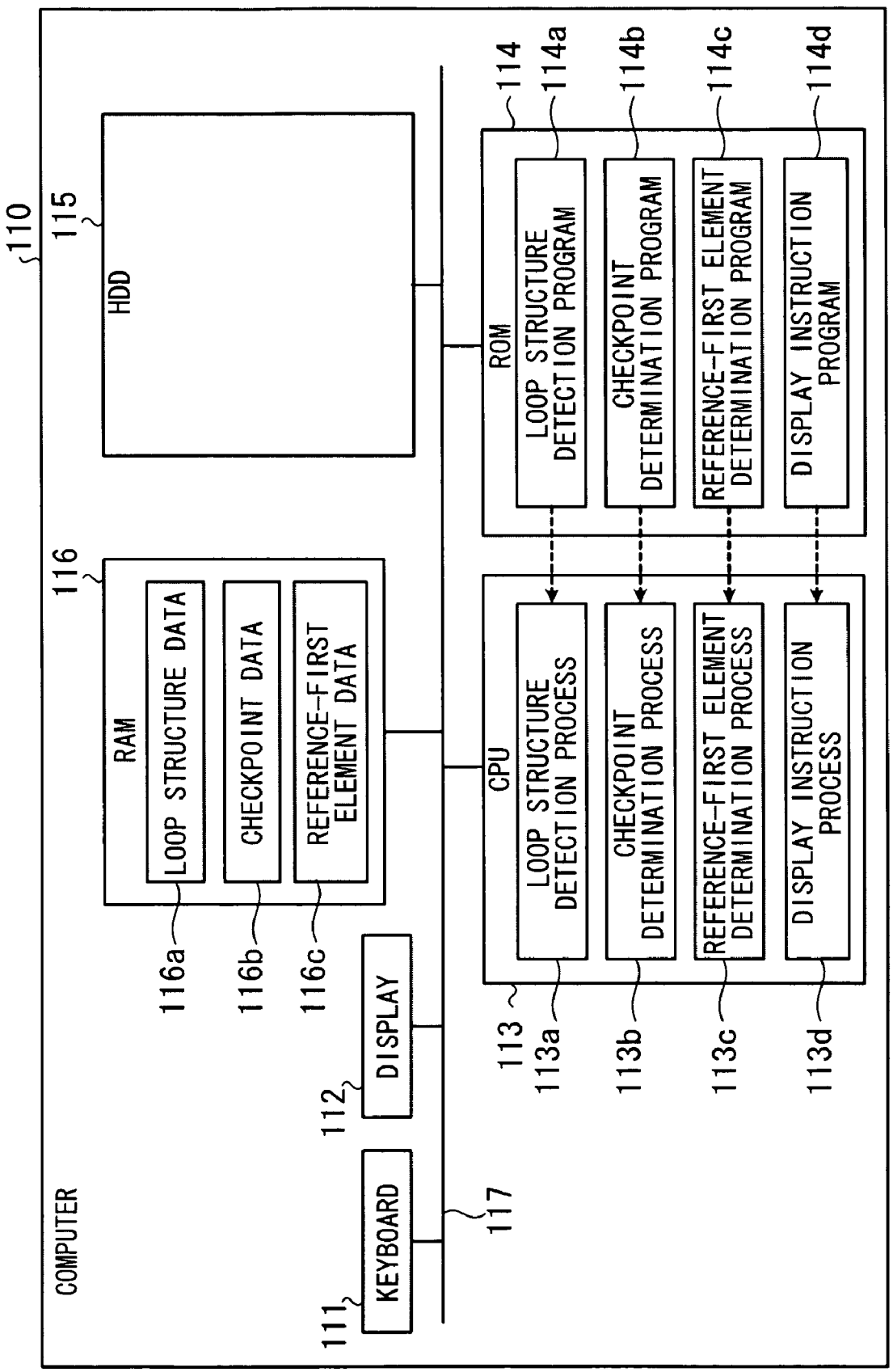
FIG. 11 is a diagram showing an example of a computer executing a save data discrimination program.

Although the above-described embodiment has addressed a case in which various types of processes are executed by hardware logics, the invention is not limited to such a case, and it may be implemented by executing a program prepared in advance with a computer. A description will now be made with reference to FIG. 11 on an example of a computer executing save data discrimination programs which provide functions similar to those of the save data discrimination apparatus 10 of the above-described embodiment 1. FIG. 11 illustrates the computer executing the save data discrimination programs according to the embodiment 1.

As shown in FIG. 11, a computer 110 as an information processing apparatus is configured by connecting a keyboard 111, a display 112, a CPU 113, a ROM 114, an HDD 115, and a RAM 116 through a bus 117.

Programs for discriminating data to be saved providing the same functions as those of the save data discrimination apparatus 10 described in the above embodiment are stored in the ROM 114. Specifically, a loop structure detection program 114a, a checkpoint determination program 114b, a reference-first element determination program 114c, and a display instruction program 114d are stored in advance as shown in FIG. 11. The programs 114a to 114d may be appropriately integrated or distributed as is true for the constituent elements of the save data discrimination apparatus 10 shown in FIG. 2.

The CPU 113 reads the programs 114a to 114d from the ROM 114 and executes them, and the programs 114a to 114d function as a loop structure detection process 113a, a checkpoint determination process 113b, a reference-first element determination process 113c, and a display instruction process 113d, respectively, as shown in FIG. 11. The processes 113a to 113d correspond to the loop structure detection unit 31, the checkpoint determination unit 32, the reference-first element discrimination unit 33, and the display instruction unit 34, respectively.

The CPU 113 executes processes for discriminating data to be saved based on loop structure data 116a, checkpoint data 116b, and reference-first element data 116c stored in the RAM 116.

It is not essential to store the programs 114a to 114d in the ROM 114 in advance. For example, the programs may be stored in advance in a "portable physical medium" such as a flexible disk (FD), CD-ROM, MO disk, DVD disk, or IC card inserted in the computer 110, or a "stationary physical medium" such as an HDD provided inside or outside the computer 110, or a "another computer (or server)" connected to the computer 110 through a public switched network, internet, LAN, or WAN. The computer 110 may read the programs from those media to execute them.

What is claimed is:

1. A data saving method of processing results including an array element which is periodically saved when a computer executes a program, the data saving method comprising:
analyzing a loop structure of the program from a source code of the program by the computer to detect a main loop of the program and a sub-loop included in the main loop;
determining a point of entrance to the detected main loop as a checkpoint by the computer that is a point for saving data of the processing results;
specifying the contents of the arithmetic process described in the detected main loop by the computer to select reference-first array elements which are array elements only referred to and defined after being referred to as checkpoint data to be saved at the checkpoint; and
saving the selected reference-first array elements by the computer as the checkpoint data,
wherein the contents of an arithmetic process in each of a plurality of sub-loops included in the detected main loop is detected at the analyzing; and
when a reference sub-loop appears after a definition sub-loop appears and a subsequent definition sub-loop that is a sub-loop of an arithmetic process defining array elements further appears, the intersection of the complement of the sum of the array elements defined by every definition sub-loop and the sum of the array elements referred to by every reference sub-loop is identified as the reference-first array elements provided that all of the array elements defined by the subsequent definition sub-loops are included in all of the array elements defined by the definition sub-loop.

2. A data saving method according to claim 1, wherein it is determined that there is no array element to be categorized as the reference-first array element when a sub-loop of an arithmetic process defining all array elements appears first after analyzing the contents of an arithmetic process in each of a plurality of sub-loops included in the detected main loop.

3. A save data discrimination method according to claim 1, further comprising:
instructing a predetermined output unit to display the checkpoint determined at the determining and the reference-first array elements identified at the specifying.

4. The save data discrimination method according to claim 1, further comprising rewriting the source code of the program such that the discriminated reference-first array elements are saved at the checkpoint.

5. A non-transitory computer-readable recording medium storing a save data discrimination program for directing a computer to execute a process of processing results including an array element which is periodically saved when the computer executes a program, the process comprising:
analyzing a loop structure of the program from a source code of the program to detect a main loop of the program and a sub-loop included in the main loop; determining a point of entrance to the main loop as a checkpoint that is a point for saving data of the processing results;
specifying the contents of the arithmetic process described in the detected main loop to select reference-first array elements which are array elements only referred to and defined after being referred to as checkpoint data to be saved at the checkpoint determined at the checkpoint determination step; and
saving the selected reference-first array elements as the checkpoint data, wherein the contents of an arithmetic process in each of a plurality of sub-loops included in the detected main loop is detected at the analyzing; and
when the reference sub-loop appears after the definition sub-loop appears and a subsequent definition sub-loop that is a sub-loop of an arithmetic process defining array elements further appears, the intersection of the complement of the sum of the array elements defined by every definition sub-loop and the sum of the array elements referred to by every reference sub-loop is identified as the reference-first array elements provided that all of the array elements defined by the subsequent definition sub-loops are included in all of the array elements defined by the definition sub-loop.

6. A data saving apparatus of processing results including an array element which is periodically saved when a computer executes a program, the data saving comprising:

an analyzing unit that analyzes a loop structure of the program from a source code of the program to detect a main loop of the program and a sub-loop included in the main loop;

a determination unit that determines a point of entrance to the detected main loop d as a checkpoint that is a point for saving data of the processing results; and a specifying unit that specifies the contents of the arithmetic process described in the detected main loop to specify reference-first array elements which are array elements only referred to and defined after being referred to as checkpoint data to be saved at the checkpoint;

a checkpoint storing unit that stores the checkpoint detected by the determination unit;

a saving unit that saves the selected reference-first array elements into the checkpoint storing unit as the checkpoint data;

a controller that controls the analyzing unit, the determination unit, the saving unit, the specifying unit and the saving unit, wherein the contents of an arithmetic process in each of a plurality of sub-loops included in the detected main loop is detected at the analyzing; and when the reference sub-loop appears after the definition sub-loop appears and a subsequent definition sub-loop that is a sub-loop of an arithmetic process defining array elements further appears, the intersection of the complement of the sum of the array elements defined by every definition sub-loop and the sum of the array elements referred to by every reference sub-loop is identified as the reference-first array elements provided that all of the array elements defined by the subsequent definition sub-loops are included in all of the array elements defined by the definition sub-loop.

7. A data saving method of processing results including an array element which is periodically saved when a computer executes a program, the data saving method comprising:

analyzing a statement described in a source code of the program to detect a start line and an end line of a main loop of the arithmetic process in the program and a start line and an end line of a sub-loop included in the main loop by the computer;

determining a point immediately after the start line of the detected main loop detected as a checkpoint by the computer that is a point for saving data of the processing results;

specifying the contents of an arithmetic process described in every sub-loop included in the main loop by the computer to categorize an array used in each arithmetic process as an array having definitions only when the array appears only on the left side, an array having references only when the array appears only on the right side, or an array having both definitions and references when the array appears on both right and left sides, the reference-first array element discrimination step identifying an array which is only referred to in the detected main loop and a reference-first array which are array elements defined after being referred to in the main loop as checkpoint data to be saved at the checkpoint; and saving the selected reference-first array elements by the computer as the checkpoint data, wherein the contents of an arithmetic process in each of a plurality of sub-loops included in the detected main loop is detected at the analyzing; and when the reference sub-loop appears after the definition sub-loop appears and a subsequent definition sub-loop that is a sub-loop of an arithmetic process defining array elements further appears, the intersection of the complement of the sum of the array elements defined by every definition sub-loop and the sum of the array elements referred to by every reference sub-loop is identified as the reference-first array elements provided that all of the array elements defined by the subsequent definition sub-loops are included in all of the array elements defined by the definition sub-loop.

8. The save data discrimination apparatus according to claim 6, further comprising a rewriting unit that rewrites the source code of the program such that the discriminated reference-first array elements are saved at the checkpoint.

9. The save data discrimination method according to claim 7, further comprising rewriting the source code of the program such that the discriminated reference-first array elements are saved at the checkpoint.

* * * * *